May 9, 1950   W. DZUS   2,506,953
FASTENING DEVICE
Filed Jan. 7, 1946
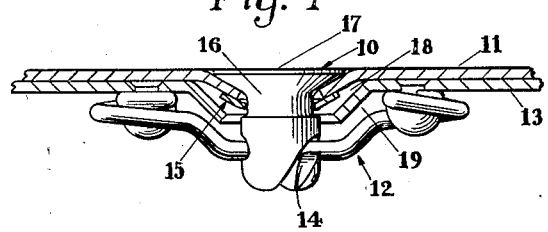
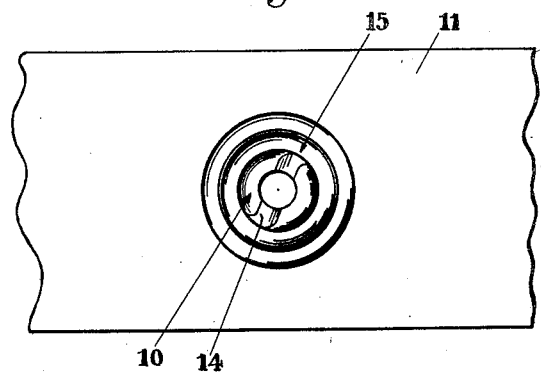
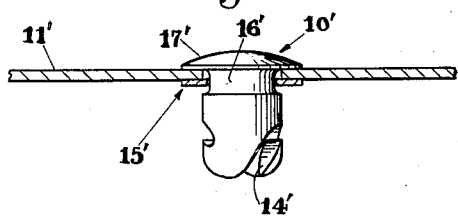
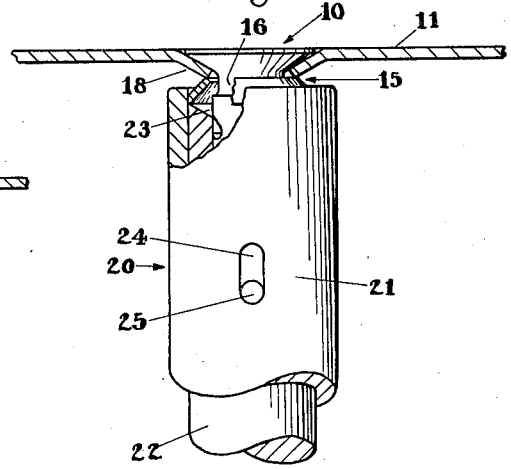
INVENTOR
William Dzus
BY
*Daniel H. Kane*
ATTORNEY Patented May 9, 1950

2,506,953

UNITED STATES PATENT OFFICE 2,506,953

FASTENING DEVICE

William Dzus, West Islip, N. Y.

Application January 7, 1946, Serial No. 639,589

2 Claims. (Cl. 24—221)

This invention relates to an improved fastening device particularly of the quick-acting self-locking type in which a stud and a spring or receptacle are interengaged and unlocked by the rotation of the stud with respect to the spring or receptacle.

My invention has particular reference to an improved fastener stud assembly and to an improved retaining disc, collar or grommet for holding the stud in assembled relation with the plate or other part in which it is installed.

It is an object of the present invention to provide an improved device and installation procedure which simplifies the installation of fastener studs; reduces the number of operations which are necessary to accomplish the installation; and which is particularly adapted to mass production methods.

A further object of the present invention is to provide an improved disc, collar or grommet for use with fastener studs of the rotary type which is of simple and inexpensive construction, which may be readily assembled with the stud upon its installation to hold the stud in position, and which, when assembled, is rugged and strong and will prevent accidental detachment of the stud.

It is another object of the invention to provide an improved fastening device of the above character which is so constructed and assembled as to provide for considerable misalignment of the parts to be fastened without effecting the proper operation of the fastener.

In the accompanying drawings:

Fig. 1 is a cross sectional view of a fastener assembly embodying my invention;

Fig. 2 is a bottom plan view of the fastener stud assembly showing the lower end of the stud with the improved retaining disc or grommet holding the parts in assembled relation;

Fig. 3 is a perspective view of my new retaining disc or grommet prior to installation;

Fig. 4 is a sectional view illustrating the method of installing the fastener stud in accordance with my invention, showing the stud and grommet in position prior to installation, and the installation tool which may be used in making the installation; and Fig. 5 is a sectional view of a modified type of fastener stud assembly showing a fastener stud having an oval head.

I have illustrated my invention as embodied in a fastening device of the spiral cam type consisting of a rotary stud 10 mounted in an aperture in the plate 11 and a conventional type of spiral cam fastener spring 12 riveted to the plate 13 so that the central cross bar thereof is disposed across an aperture in the plate which is in substantial alignment with the aperture in plate 11. When the fastener is locked, the stud projects through the aperture of the two plates and the spiral cam 14 engages with the cross bar of the spring, the detent in the spiral cam preventing the fastener from accidentally opening.

Upon rotation of the stud, through a quarter turn in a counter-clockwise direction, the fastening device is opened permitting a separation of the plates. Upon rotation of the stud through a quarter turn in a clockwise direction, the fastening device is locked thereby retaining the plates in the manner shown in Fig. 1.

My invention has particular relation to an improved stud assembly whereby the fastener stud is retained in position in the plate 11 so that it can rotate, but so that it cannot become accidentally detached by means of a novel type of retaining disc, collar or grommet indicated generally at 15.

In this connection it should be noted that the fastener stud is provided with a groove or undercut 16 extending around the shank immediately beneath the head. The groove is positioned in the aperture in plate 11 when the stud is assembled with the plate and the retaining disc, collar or grommet 15 projects into the groove so as to retain the stud in position.

The retaining disc or grommet is in the form of a ring or annulus having a central aperture and which may be made by being stamped and drawn from sheet metal. Prior to installation the grommet is in the form shown in Fig. 3, that is, it is generally of a truncated conical shape, the central aperture thereof being large enough to fit over the shank or lower end of the stud to which it is to be applied, but preferably without much room to spare.

In this connection the taper of the truncated conical grommet, prior to installation, need not be in a straight line, but may be in the form of a curve or arc.

In installing a fastener stud, the stud is first inserted through the aperture in the plate, then the retaining disc, collar or grommet is placed over the end of the stud with the truncated tapered end thereof projecting towards the head and disposed in alignment with the groove 16. The disc, collar or grommet is then clinched or formed by a simple tool so as to cause the inner edge thereof to project into the groove, locking it in position. This is accomplished by forcing the peripheral portion of the grommet into substantially the same plane or slightly beyond the same plane as the inner edge with the result that the inner edge is compressed inwardly.

In the form of my invention, shown in the first four figures of the drawing, I have illustrated a fastener stud 10 of the flush type having a head 17 with a flat outer surface and which tapers inwardly towards the groove 16. The plate 11 is formed with a dimple 18 which conforms with and accommodates the tapered sides of the head and thereby provides for a flush installation. Plate 13 is also provided with a dimple 19 of a size and shape to accommodate the dimple 18 when the parts are assembled.

In clinching or forming the retaining disc or grommet so as to hold the stud in position in the first form of my invention a simple tool, such as that illustrated at 20, may be employed, the tool being provided with a handle or sleeve 21 and a forming portion 22 having a tubular end with an inwardly tapered face 23 which is pressed against the grommet causing the peripheral portion thereof to shift towards and slightly beyond the plane of the inner edge and assume the contour of the dimple 18, whereby the inner edge is compressed or extruded inwardly into the groove 16. Sleeve 21 is provided with a longitudinal slot 24 which accommodates pin 25 mounted on member 22 so that sleeve 21 may be grasped in the hand and member 22 may be shifted upwardly in clinching the grommet.

In this type of installation the aperture through the plate 11 may be somewhat larger than the diameter of the fastener stud in the groove 16 so as to permit lateral shifting of the stud, and the external diameter of dimple 18 is smaller than the internal diameter of dimple 19 permitting lateral shifting of plate 11 with respect to plate 13. The aperture in plate 13 is also slightly larger than the shank of the stud. This construction permits the fastening device to function properly even when there is considerable misalignment between the parts since the stud may shift laterally with respect to plate 11 and plate 11 will fit flushly and snugly against plate 13 even though dimple 18 is not centered with respect to dimple 19.

My improved fastening device and new retaining disc, collar or grommet is not limited to use with a fastener stud of the flush head variety and may be used with any other type of head, thus in Fig. 5 I have illustrated the invention as embodied in a stud assembly employing a stud 10', having a head 17', the upper surface of which is oval and the under surface of which is flat. Immediately beneath the head, a groove 16' is formed around the shank.

The stud is installed in the plate 11' having an aperture formed therethrough through which the stud is projected with the grooved portion being disposed in the aperture when the device is assembled.

The stud is held in position by means of the retaining disc or grommet 15', which prior to assembly is identical in construction with the retaining disc or grommet 15 shown in Fig. 3.

In assembling the device the stud is projected through the aperture and the retaining disc or grommet is placed over the end of the fastener with the tapered or truncated end projecting towards the head and disposed in alignment with the groove.

A tool, somewhat similar to that shown at 20 in Fig. 5, may be employed, the forming portion being used to press the outer portion of the disc towards the plane of the inner edge and against the flat under surface of the plate 15' forming a flat annulus with the inner edge projecting into the groove and retaining the stud in assembled relationship.

In this form of my invention the aperture formed in the plate 11' is somewhat larger than the diameter of the stud in the grooved portion thereof so as to permit lateral shifting of the stud. In this way the fastener may be properly operated even though there is considerable misalignment between the parts.

When installed the fastener operates in a manner similar to the conventional quick-acting self-locking fastener.

It will thus be seen that I have provided an improved fastening device which is simple to manufacture and install and is rugged and strong in construction.

I claim:

1. A fastener assembly comprising a part to be fastened having an aperture therein; a fastener stud having a head, a depending shank and a neck portion of smaller diameter than the shank connected between the head and shank, said stud being inserted in the aperture with the head on one side of the part, the shank on the other side of the part and the neck positioned in the aperture; and a retaining collar comprising a metal disk formed with a central opening smaller in diameter than the shank of the stud but larger in diameter than the neck portion, said disk being disposed around the neck portion of the stud on the opposite side of the part from the head, the diameter of the aperture in the part being slightly greater than the diameter of the shank of the stud and being substantially greater than the diameter of the neck portion so that the stud may shift laterally with respect to the part, and the diameter of the head and the outside diameter of the collar being greater than the diameter of the aperture in the part so as to retain the stud in place.

2. A fastener assembly comprising a part to be fastened having a dimple therein and a central aperture extending through the dimple; a fastener stud having a head, a depending shank and a neck portion of smaller diameter than the shank connected between the head and shank, said stud being inserted in the aperture with the head disposed in the dimple on one side of the part and the shank on the other side of the part and the neck positioned in the aperture; a retaining collar comprising a metal disk formed with a central opening smaller in diameter than the shank of the stud but larger in diameter than the neck portion, said disk being disposed around the neck portion of the stud on the opposite side of the part from the head, the diameter of the aperture in the part being slightly greater than the diameter of the shank of the stud and being substantially greater than the diameter of the neck portion so that the stud may shift laterally with respect to the part and the diameter of the head and the outside diameter of the collar being greater than the diameter of the aperture in the part so as to retain the stud in place; a second part adapted to be fastened to the first part and formed with a dimple and a central aperture extending therethrough adapted to accommodate the first dimple; and fastening means secured to the second part adjacent to the dimple and aperture and interengageable with the stud upon the rotation thereof, the dimple in the second part being larger than the dimple in the first part so as to permit lateral shifting of the parts with respect to each other.

WILLIAM DZUS.

REFERENCES CITED

The following references are of record in the file of this patent:

UNITED STATES PATENTS

| Number | Name | Date |
| --- | --- | --- |
| 721,559 | Goodridge | Feb. 24, 1903 |
| 1,481,217 | Maloy | Jan. 15, 1924 |
| 1,955,740 | Dzus | Apr. 24, 1934 |
| 2,120,530 | Shippee et al. | June 14, 1938 |
| 2,141,087 | Rau | Jan. 10, 1939 |
| 2,301,477 | Taylor | Nov. 10, 1942 |
| 2,372,496 | Huelster | Mar. 27, 1945 |
| 2,382,973 | Cannova | Aug. 21, 1945 |
| 2,392,718 | Baldwin | Jan. 8, 1946 |
| 2,434,876 | Warren | Jan. 20, 1948 |
| 2,486,412 | Huelster | Nov. 1, 1949 |